United States Patent
Kishikawa et al.

(10) Patent No.: US 8,511,158 B2
(45) Date of Patent: Aug. 20, 2013

(54) FLOW RATE MEASURING APPARATUS HAVING STRESS REDUCING MEANS

(75) Inventors: Naoyuki Kishikawa, Chiyoda-ku (JP); Koji Tanimoto, Chiyoda-ku (JP); Yuji Ariyoshi, Chiyoda-ku (JP); Masahiro Kawai, Chiyoda-ku (JP); Shinichiro Hidaka, Chiyoda-ku (JP); Hiroyuki Uramachi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 403 days.

(21) Appl. No.: 12/897,238

(22) Filed: Oct. 4, 2010

(65) Prior Publication Data

US 2012/0000280 A1    Jan. 5, 2012

(30) Foreign Application Priority Data

Jul. 2, 2010 (JP) .................................. 2010-151730

(51) Int. Cl.
*G01F 1/68* (2006.01)

(52) U.S. Cl.
USPC ..................................................... 73/204.22

(58) Field of Classification Search
None
See application file for complete search history.

(56) References Cited

U.S. PATENT DOCUMENTS

| 6,729,181 | B2 * | 5/2004 | Mayer et al. | 73/204.22 |
| 7,712,361 | B2 * | 5/2010 | Uramachi | 73/204.22 |
| 2007/0089504 | A1 * | 4/2007 | Hanzawa et al. | 73/204.26 |
| 2009/0000366 | A1 | 1/2009 | Uramachi | |

FOREIGN PATENT DOCUMENTS

| DE | 10 2007 057 221 A1 | 1/2009 |
| JP | 04-122818 A | 4/1992 |
| JP | 05-302839 A | 11/1993 |
| JP | 2007-024589 A | 2/2007 |
| JP | 2009-008619 A | 1/2009 |
| JP | 2009-85855 A | 4/2009 |
| JP | 2010-133829 A | 6/2010 |

OTHER PUBLICATIONS

German Office Action dated Jan. 31, 2010, in corresponding Application No. 10 2010 049 118.7-52.
Japanese Office Action mailed Oct. 23, 2012 issued in a corresponding Japanese Patent Application No. 2010-151730.

* cited by examiner

*Primary Examiner* — Harshad R Patel
(74) *Attorney, Agent, or Firm* — Sughrue Mion, PLLC (57) ABSTRACT

Provided is a flow rate measuring apparatus which prevents a reduction in flow-rate detection accuracy through reducing stress applied to a flow rate detection element. The flow rate measuring apparatus includes a support member (8) provided with a stepped portion (9) formed between a region facing a circuit board (5) and a region facing a detection portion of a flow rate detection element (3), in which the support member (8) includes a groove portion (11*a*) provided on a side opposite to an insertion hole (2) with respect to the region facing the detection portion, for reducing stress applied to the flow rate detection element (3).

11 Claims, 13 Drawing Sheets

FLOW RATE MEASURING APPARATUS HAVING STRESS REDUCING MEANS

BACKGROUND OF THE INVENTION

1. Field of the Invention

The present invention relates to a flow rate measuring apparatus installed in, for example, an intake pipe through being inserted into an insertion hole formed in the intake pipe, for measuring a flow rate of air passing through the intake pipe.

2. Description of the Related Art

Conventionally, there is known a flow rate measuring apparatus including a flow rate detection element for detecting a flow rate of air flowing through an intake pipe, a circuit board for driving the flow rate detection element, and a support member for supporting the circuit board and the flow rate detection element (for example, see Japanese Patent Application Laid-open No. 2009-008619 (paragraphs 0012 to 0031)).

The resin support member includes a base and a plate which is superimposed and bonded onto the base with a bonding material and on which the circuit board and the flow rate detection element are placed. The support member includes a stepped portion formed between a region facing the circuit board and a region facing a detection portion of the flow rate detection element, the region facing the detection portion being thinner than the region facing the circuit board.

In the flow rate measuring apparatus having the above-mentioned configuration, when the region facing the detection portion of the flow rate detection element, which is thinner than the region facing the circuit board, is deformed due to curing treatment for the bonding material or a temperature change under a usage environment, deformation occurs while the stepped portion serves as a starting point of the deformation. As a result, stress is applied to the flow rate detection element arranged in a vicinity of the stepped portion, which causes a problem in that flow-rate detection accuracy is reduced.

SUMMARY OF THE INVENTION

In order to solve the above-mentioned problem, it is an object of the present invention to provide a flow rate measuring apparatus which prevents a reduction in flow-rate detection accuracy through reducing the stress applied to the flow rate detection element.

According to the present invention, there is provided a flow rate measuring apparatus installed in a piping through being inserted into an insertion hole formed in the piping, for measuring a flow rate of a fluid to be measured passing through the piping. The flow rate measuring apparatus includes: a flow rate detection element for detecting the flow rate of the fluid to be measured; a circuit board provided on a side of the insertion hole with respect to the flow rate detection element, for driving the flow rate detection element; and a support member made of a resin, for supporting the circuit board and the flow rate detection element, the support member including a stepped portion formed between a region facing the circuit board and a region facing a detection portion of the flow rate detection element, in which the support member includes stress reducing means provided on a side opposite to the insertion hole with respect to the region facing the detection portion, for reducing stress applied to the flow rate detection element.

According to the flow rate measuring apparatus of the present invention, the support member includes the stress reducing means provided on the side opposite to the insertion hole with respect to the region facing the detection portion, for reducing the stress applied to the flow rate detection element. Thus, it is possible to prevent the reduction in flow-rate detection accuracy.

DETAILED DESCRIPTION OF THE PREFERRED EMBODIMENTS

In the following, embodiments of the present invention are described with reference to the drawings. Throughout the drawings, the same or corresponding members and parts are denoted by the same reference symbols.

First Embodiment

Figure 1:
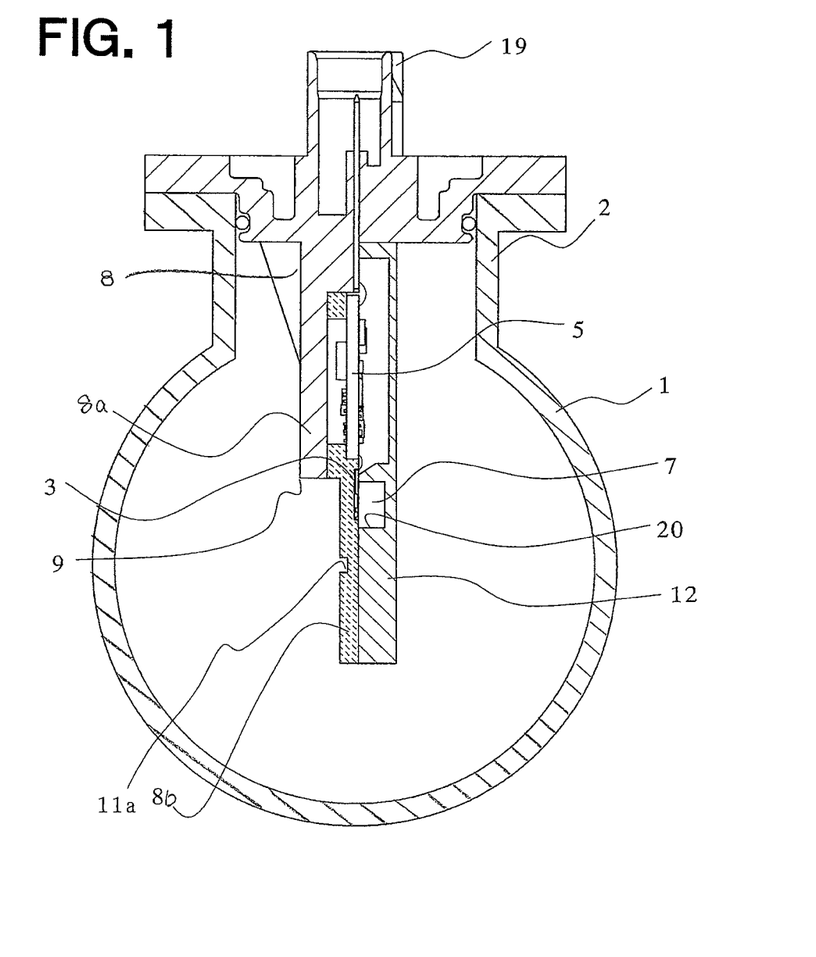
FIG. 1 is a cross-sectional side view of a flow rate measuring apparatus according to a first embodiment of the present invention.
Figure 2:
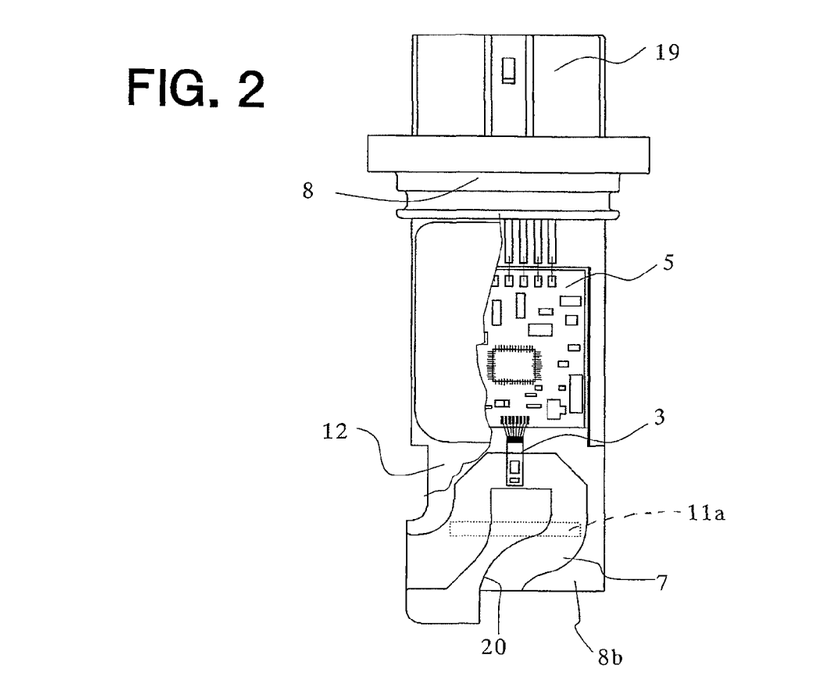
FIG. 2 is a partially cut-away front view of the flow rate measuring apparatus of FIG. 1.
Figure 3:
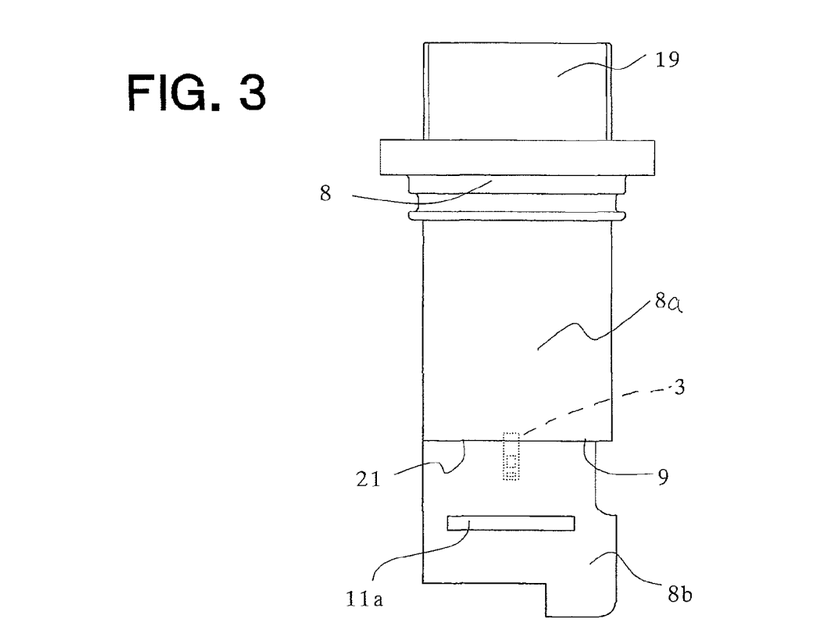
FIG. 3 is a back view of the flow rate measuring apparatus of FIG. 1.
Figure 4:
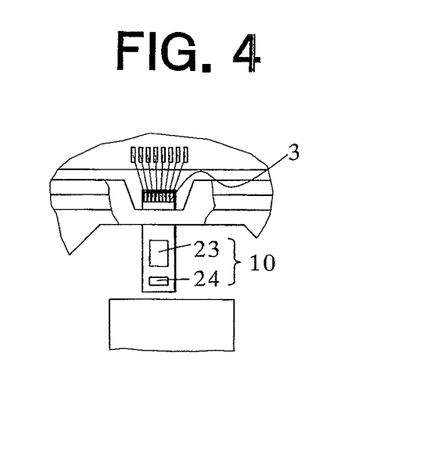
FIG. 4 is an enlarged view of main portions of FIG. 1.
Figure 5:
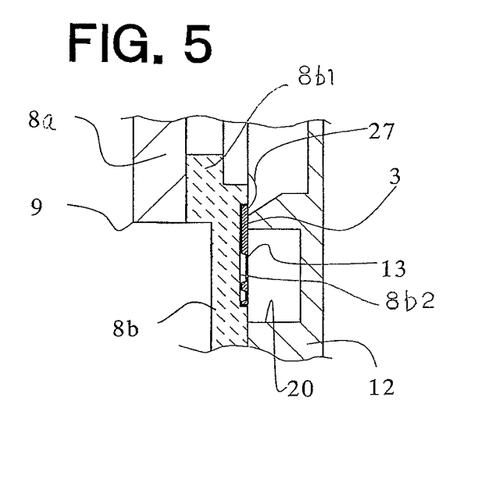
FIG. 5 is an enlarged view of main portions of FIG. 2.
Figure 6:
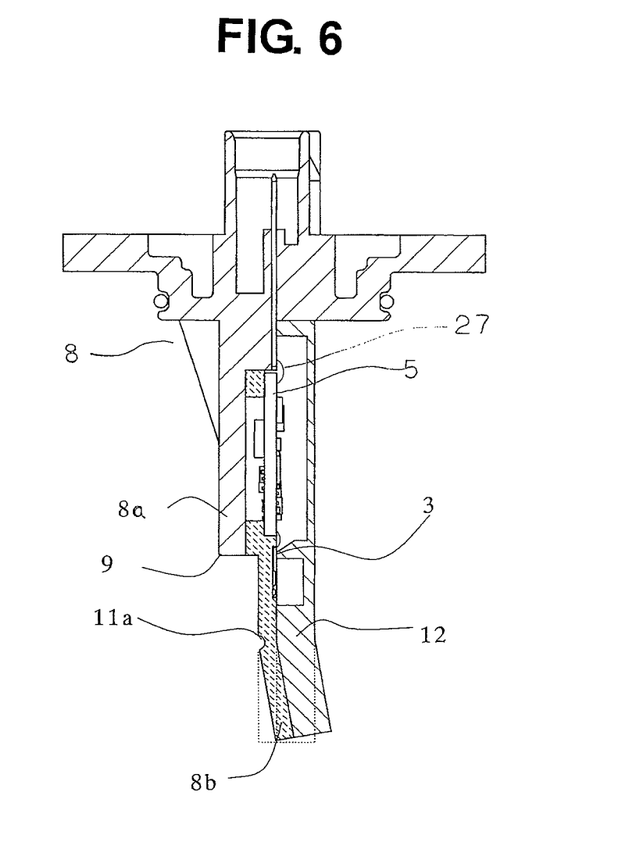
FIG. 6 is a cross-sectional side view of the flow rate measuring apparatus of FIG. 1 deformed due to a temperature change.

FIG. 1 is a cross-sectional side view of a flow rate measuring apparatus according to a first embodiment of the present invention. FIG. 2 is a partially cut-away front view of the flow rate measuring apparatus of FIG. 1. FIG. 3 is a back view of the flow rate measuring apparatus of FIG. 1. FIG. 4 is an enlarged view of main portions of FIG. 1. FIG. 5 is an enlarged view of main portions of FIG. 2. FIG. 6 is a cross-sectional side view of the flow rate measuring apparatus of FIG. 1 deformed due to a temperature change.

The flow rate measuring apparatus measures a flow rate of air serving as a fluid to be measured and passing through an intake pipe 1, and is installed in the intake pipe 1 of an internal combustion engine through being inserted into an insertion hole 2 of the intake pipe 1.

The flow rate measuring apparatus includes: a flow rate detection element 3 for detecting the flow rate of air; a circuit board 5 provided on a side of the insertion hole 2 with respect to the flow rate detection element 3, for driving the flow rate detection element 3; a support member 8 for supporting the circuit board 5 and supporting the flow rate detection element 3; and a cover 12 superimposed onto the support member 8 to form, together with the support member 8, a bypass passage 7 through which part of the air flows in.

In the support member 8 including a base 8a and a plate 8b, a stepped portion 9 is formed between a region facing the circuit board 5 and a region facing a detection portion 10 of the flow rate detection element 3. In the support member 8, the region facing the detection portion 10 is thinner than the region facing the circuit board 5.

The above-mentioned plate 8b is made of, for example, a polybutylene terephthalate (PBT) resin. On the plate 8b, the circuit board 5 is bonded and fixed on a window-shaped frame portion 8b1. Further, in the plate 8b, a recessed portion 8b2 is formed next to the frame portion 8b1 on the bypass passage 7 side. The flow rate detection element 3 is received in the recessed portion 8b2. The flow rate detection element 3 is electrically connected to the circuit board 5 through a wire 27 by means of wire bonding. Note that, the electrical connection between the flow rate detection element 3 and the circuit board 5 may be carried out by means of welding, soldering, or the like.

The above-mentioned flow rate detection element 3 has a flow rate detection surface 13 that forms part of a wall of the bypass passage 7. The flow rate detection element 3 includes a thinned portion formed through being subjected to etching from a back surface of an insulating plate made of silicon, ceramics, etc. On the thinned portion, the detection portion 10 including a flow rate detection resistor 23 and a temperature compensation resistor 24 is formed.

Further, the plate 8b includes a groove portion 11a serving as stress reducing means for reducing stress applied to the flow rate detection element 3. The groove portion 11a is formed in a portion away from the flow rate detection element 3 to a side opposite to the insertion hole 2 and in a surface of the plate 8b opposite to a surface of the plate 8b on which the flow rate detection element 3 is placed.

The base 8a and the plate 8b are fixed at the frame portion 8b1 with a bonding material. The base 8a on the insertion hole 2 side is integrated through molding with a connector 19 for sending/receiving a signal to/from external equipment. A terminal of the connector 19 has one end portion in the form of a terminal, and the other end portion electrically connected to the circuit board 5.

The above-mentioned cover 12 is bonded and fixed onto the surface of the base 8a on the circuit board 5 side and onto the surface of the plate 8b on which the flow rate detection element 3 is placed. The cover 12 covers the circuit board 5, and includes a bypass passage groove 20 formed therein. The bypass passage groove 20 forms the bent bypass passage 7 together with the plate 8b. The cover 12 has a thickness and a resin volume larger than those of the plate 8b.

In this case, a shrinkage in a thickness direction of the cover 12 is high, and hence the plate 8b is pulled toward the cover 12 so that a degree of deformation of the plate 8b is high. However, because the groove portion 11a is formed, there is obtained an increased effect of reducing the stress applied to the flow rate detection element 3 along with the deformation of the plate 8b.

Next, an operation of the groove portion 11a serving as the stress reducing means is described.

Figure 22:
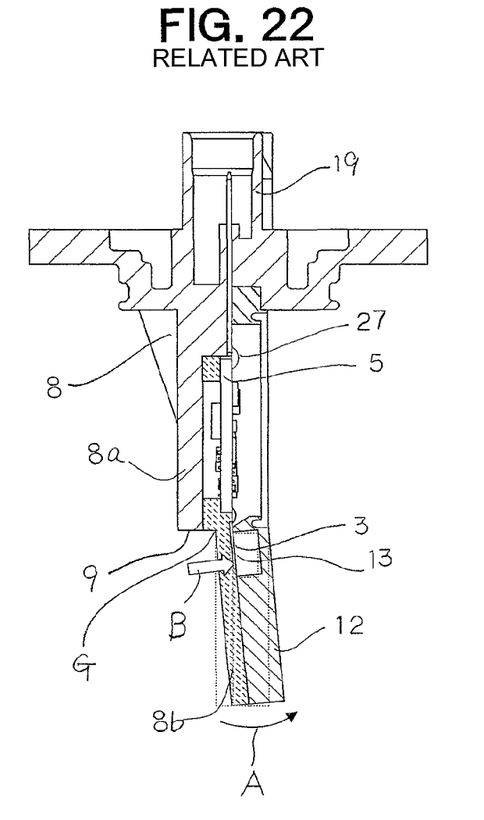
FIG. 22 is a view showing a problem in a conventional art apparatus compared with FIG. 6.

FIG. 22 is a cross-sectional side view of a flow rate measuring apparatus which is disclosed in Japanese Patent Application Laid-open No. 2009-008619 and is not provided with the groove portion 11a.

In the flow rate measuring apparatus, the plate 8b and the flow rate detection element 3, the base 8a and the plate 8b, and the plate 8b and the cover 12 are bonded to each other with a thermosetting bonding material, and the bonding material is cured under high temperature at the time of assembly.

The respective members are bonded to each other while the resin is thermally expanded under high temperature. At this time, no stress is applied to the flow rate detection element 3.

Next, after the bonding material is cured, when the bonding material is cooled to room temperature, the resin expanded under high temperature between the respective members shrinks. In this case, the problem is a bonded portion between the plate 8b and the cover 12. Both the resin cover 12 and the plate 8b shrink through being cooled. However, because a thickness of the cover 12 is larger than a thickness of the plate 8b, a shrinkage in the thickness direction of the cover 12 is high. Thus, as illustrated by an arrow A of FIG. 22, the plate 8b is pulled toward the cover 12 to be deformed.

In this case, of the support member 8, a starting point of deformation is the stepped portion 9 formed between the region facing the circuit board 5 and the region facing the detection portion 10 of the flow rate detection element 3. In the support member 8, the region facing the detection portion 10 is smaller in thickness than the region facing the circuit board 5, and hence the support member 8 is deformed while a base portion G of the stepped portion 9 serves as the starting point of deformation. Due to the deformation of the region facing the detection portion 10, the resin plate 8b pushes up part of the flow rate detection element 3 having a different coefficient of thermal expansion so that there is generated stress in an arrow B direction perpendicular to the flow rate detection surface 13 of the flow rate detection element 3.

The flow rate measuring apparatus in this state is shipped as a product, and hence the flow rate detection element 3 remains applied with residual stress.

However, if not changing, the residual stress does not cause a problem on the characteristic of the flow rate detection element 3.

However, under a usage environment, the resin is deteriorated with age, which causes a change in physical properties such as a reduction in Young's modulus. In particular, deterioration of the resin is significantly accelerated under high temperature. Due to the change in physical properties, the cover 12, which is thermally set to shrink, tends to be gradually returned to an original shape before shrinking, and hence the deformation of the plate 8b is relaxed so that the residual stress is relaxed. The relaxation of the stress causes a gradual variation in a value of resistance of each of the resistors formed in the flow rate detection element 3. As a result, there arises a problem of a reduction in flow-rate detection accuracy.

Further, in the case where the flow rate measuring apparatus is mounted under high temperature environment after being shipped as the product, similarly to the case of the deformation when the bonding material is cured, the resin between the respective members is thermally expanded. Also in this case, the problem is the bonded portion between the plate 8b and the cover 12. Due to the thermal expansion under high temperature, the cover 12, which is thermally set to shrink, tends to be returned to the original shape before shrinking, and hence the deformation of the plate 8b is relaxed so that the residual stress is relaxed.

The relaxation of the stress causes a temporary variation in the value of resistance of each of the resistors formed in the flow rate detection element 3. As a result, there arises a problem of the reduction in flow-rate detection accuracy.

As described in the above-mentioned problem, when the flow rate measuring apparatus is shipped as a product under a state in which the flow rate detection element 3 remains applied with stress, there is generated a change in the characteristic of the flow rate detection element 3 such as a change caused by creep with age or a temporary change under high temperature. Thus, detection accuracy of the flow rate measuring apparatus is reduced.

In contrast, in this embodiment, the groove portion 11a serving as the stress reducing means is provided. Therefore, in the case where the plate 8b is deformed through being pulled toward the cover 12 when the bonding material is thermally set and then cooled, the starting point of deformation is shifted close to the groove portion 11a as illustrated in FIG. 6.

Therefore, even when the deterioration of the resin or the temperature change occurs, only a lower portion of the plate 8b with respect to the groove portion 11a is deformed, and hence the stress generated in the flow rate detection element 3 is significantly reduced. Accordingly, it is possible to prevent a reduction in the detection accuracy of the flow rate measuring apparatus.

Second Embodiment

Figure 7:
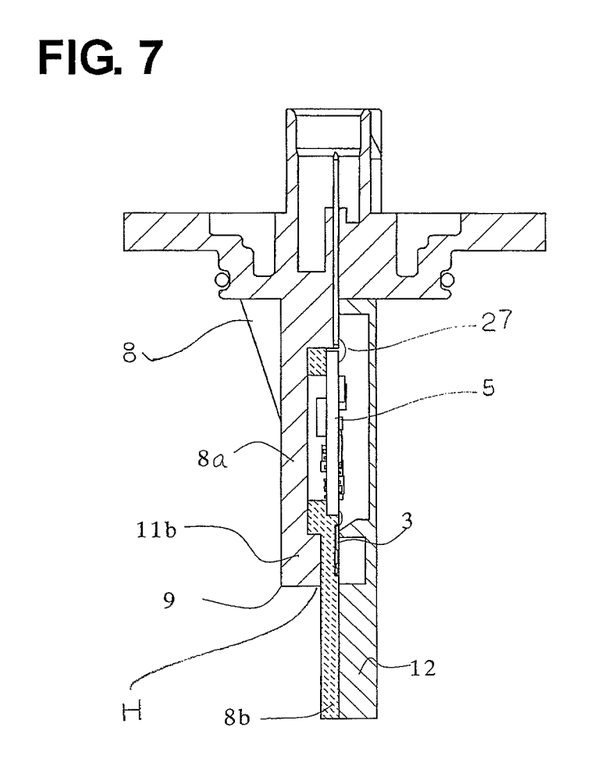
FIG. 7 is a cross-sectional side view of a flow rate measuring apparatus according to a second embodiment of the present invention.
Figure 8:
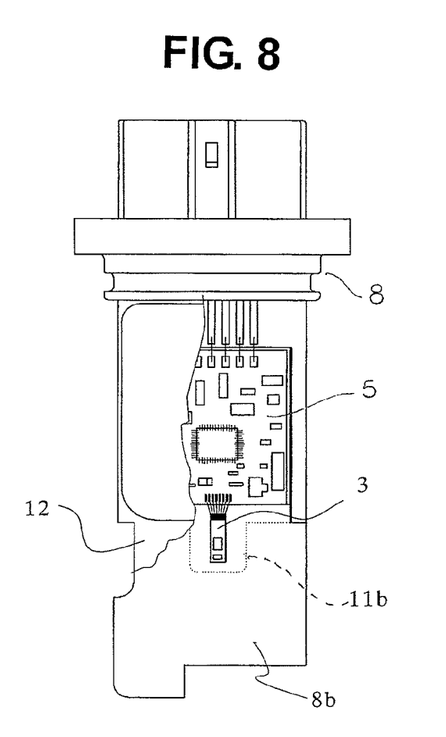
FIG. 8 is a partially cut-away front view of the flow rate measuring apparatus of FIG. 7.
Figure 9:
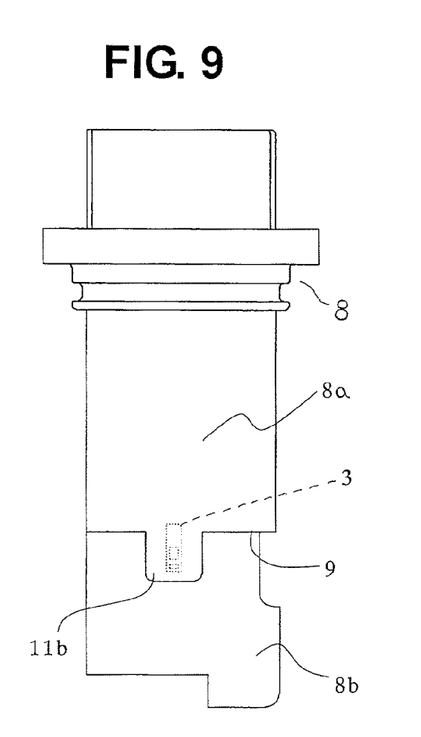
FIG. 9 is a back view of the flow rate measuring apparatus of FIG. 7.

FIG. 7 is a cross-sectional side view of a flow rate measuring apparatus according to a second embodiment of the present invention. FIG. 8 is a partially cut-away front view of the flow rate measuring apparatus of FIG. 7. FIG. 9 is a back view of the flow rate measuring apparatus of FIG. 7.

In this embodiment, the base 8a is additionally provided with a reinforcing portion 11b serving as stress reducing means and covering the surface of the plate 8b opposite to the surface of the plate 8b on which the flow rate detection element 3 is placed.

The other components are the same as those of the first embodiment.

In the second embodiment, a leading end portion H of the reinforcing portion 11b serves as the starting point of deformation of the support member 8, and hence the support member 8 is deformed from the starting point away from the flow rate detection element 3. Accordingly, similarly to the case of the first embodiment, the stress generated in the flow rate detection element 3 is significantly reduced, and thus it is possible to prevent the reduction in the detection accuracy of the flow rate measuring apparatus.

Third Embodiment

Figure 10:
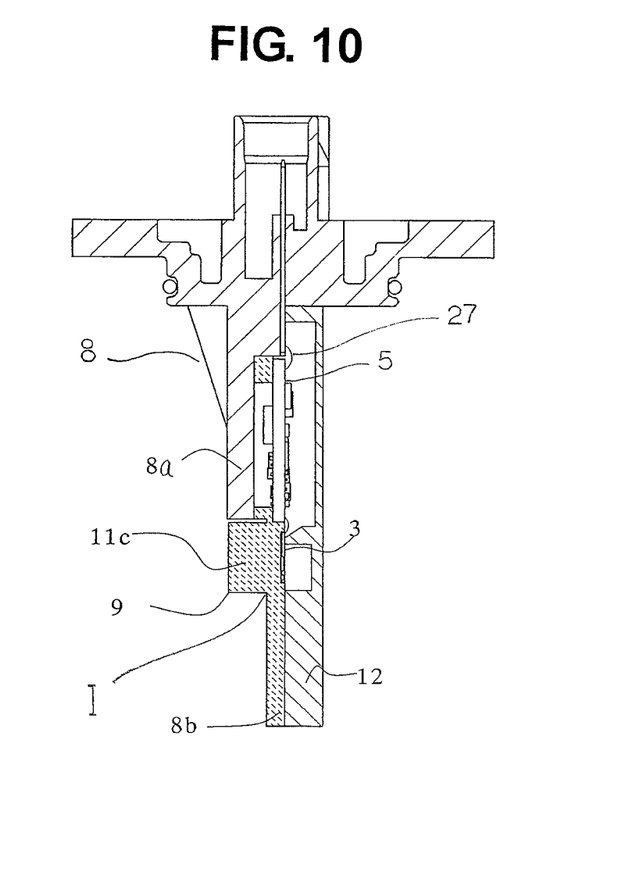
FIG. 10 is a cross-sectional side view of a flow rate measuring apparatus according to a third embodiment of the present invention.
Figure 11:
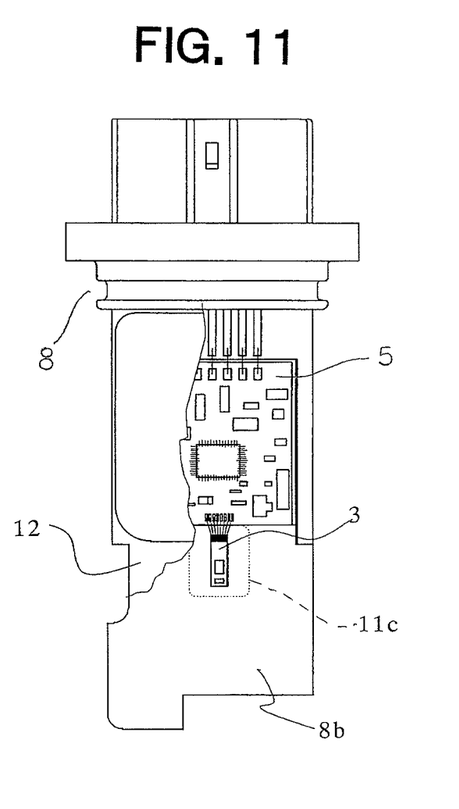
FIG. 11 is a partially cut-away front view of the flow rate measuring apparatus of FIG. 10.
Figure 12:
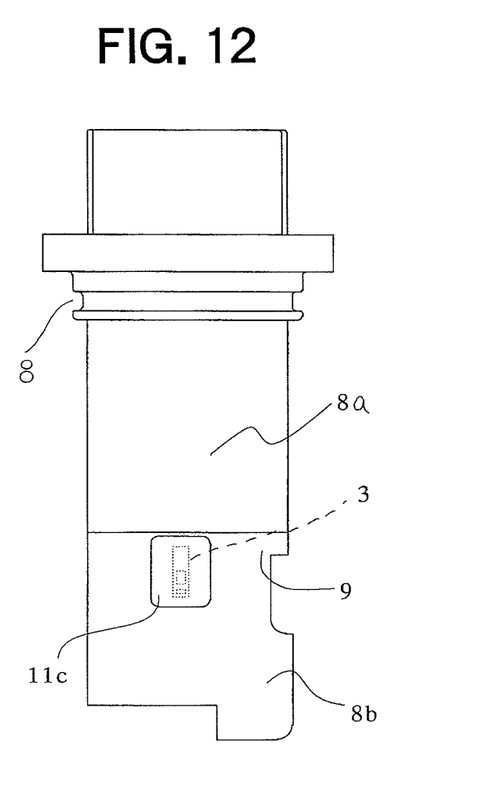
FIG. 12 is a back view of the flow rate measuring apparatus of FIG. 10.

FIG. 10 is a cross-sectional side view of a flow rate measuring apparatus according to a third embodiment of the present invention. FIG. 11 is a partially cut-away front view of the flow rate measuring apparatus of FIG. 10. FIG. 12 is a back view of the flow rate measuring apparatus of FIG. 10.

In this embodiment, the plate 8b is additionally provided with a reinforcing portion 11c serving as stress reducing means and having a large thickness and a swelled surface opposite to the surface on which the flow rate detection element 3 is placed.

The other components are the same as those of the first embodiment.

In the third embodiment, a base portion I of the reinforcing portion 11c serves as the starting point of deformation of the support member 8, and hence the support member 8 is deformed from the starting point away from the flow rate detection element 3. Accordingly, similarly to the case of the first embodiment, the stress generated in the flow rate detection element 3 is significantly reduced, and thus it is possible to prevent the reduction in the detection accuracy of the flow rate measuring apparatus.

Fourth Embodiment

Figure 13:
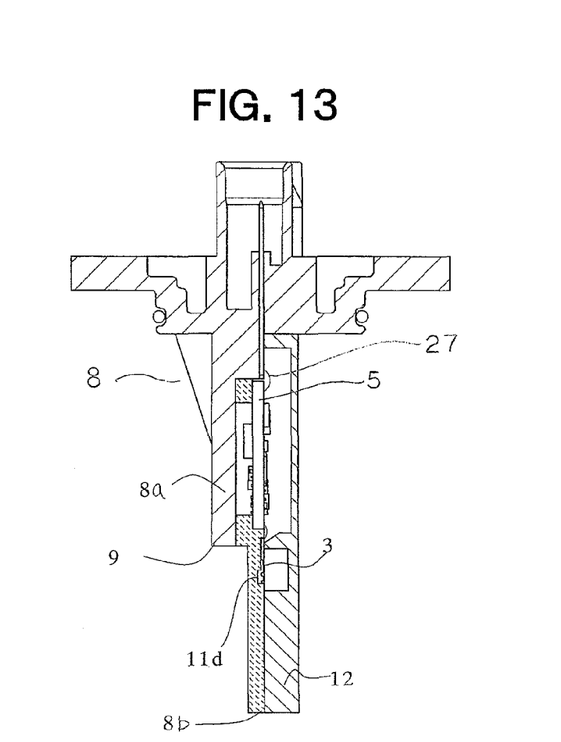
FIG. 13 is a cross-sectional side view of a flow rate measuring apparatus according to a fourth embodiment of the present invention.
Figure 14:
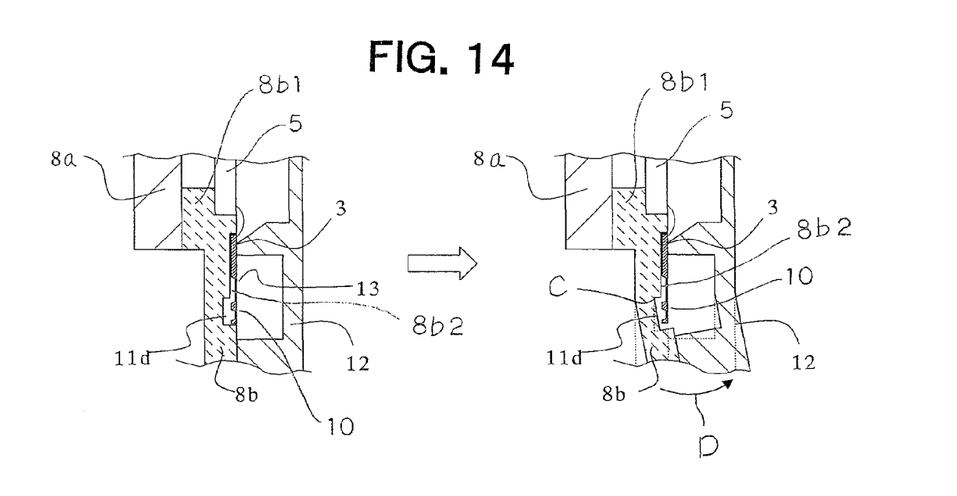
FIG. 14 is an enlarged view of main portions of FIG. 13.

FIG. 13 is a cross-sectional side view of a flow rate measuring apparatus according to a fourth embodiment of the present invention. FIG. 14 is an enlarged view of main portions of FIG. 13.

In this embodiment, a groove portion 11d serving as stress reducing means is formed in the recessed portion 8b2 receiving the flow rate detection element 3 in the surface of the plate 8b on which the flow rate detection element 3 is placed, and formed in a vicinity of a leading end portion of the flow rate detection element 3 opposite to the insertion hole 2.

As illustrated in FIG. 14 (right side), the groove portion 11d is formed in the region facing the detection portion 10 in the vicinity of the leading end portion of the flow rate detection element 3, and formed with a gap between the leading end of the flow rate detection element 3 and the plate 8b so as not to interfere with the flow rate detection element 3 even when the plate 8b is deformed from a starting point C.

The other components are the same as those of the first embodiment.

In the fourth embodiment, even when the plate 8b is deformed in an arrow D direction from the starting point C of the groove portion 11d, the detection portion 10 is situated in a space portion of the groove portion 11d, and the gap is formed between the leading end portion of the flow rate detection element 3 and the plate 8b. Accordingly, the stress caused by the deformation of the plate 8b is not generated in the flow rate detection element 3. Thus, similarly to the case of the first embodiment, it is possible to prevent the reduction in the detection accuracy of the flow rate measuring apparatus.

Fifth Embodiment

Figure 15:
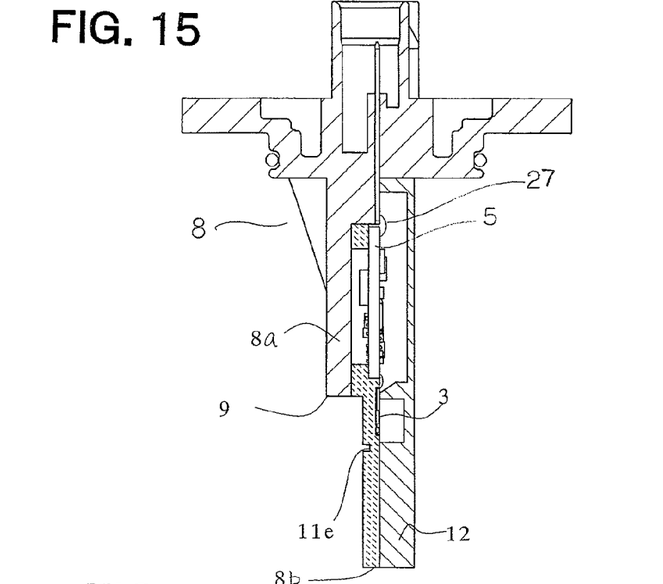
FIG. 15 is a cross-sectional side view of a flow rate measuring apparatus according to a fifth embodiment of the present invention.
Figure 16:
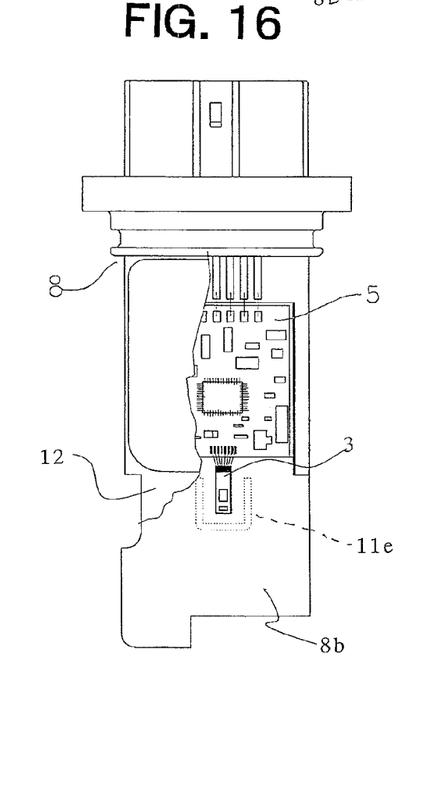
FIG. 16 is a partially cut-away front view of the flow rate measuring apparatus of FIG. 15.
Figure 17:
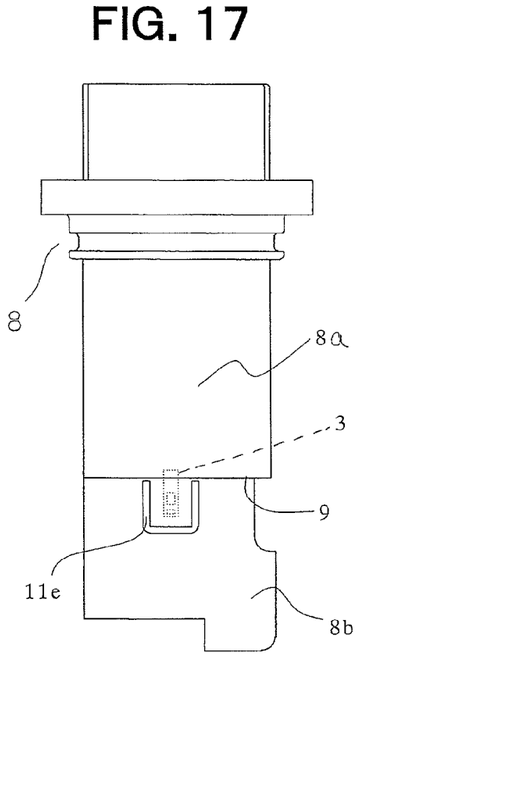
FIG. 17 is a back view of the flow rate measuring apparatus of FIG. 15.

FIG. 15 is a cross-sectional side view of a flow rate measuring apparatus according to a fifth embodiment of the present invention. FIG. 16 is a partially cut-away front view of the flow rate measuring apparatus of FIG. 15. FIG. 17 is a back view of the flow rate measuring apparatus of FIG. 15.

In this embodiment, the plate 8b is provided with a groove portion 11e serving as stress reducing means and surrounding the flow rate detection element 3 on three sides.

The other components are the same as those of the first embodiment.

Figure 18:
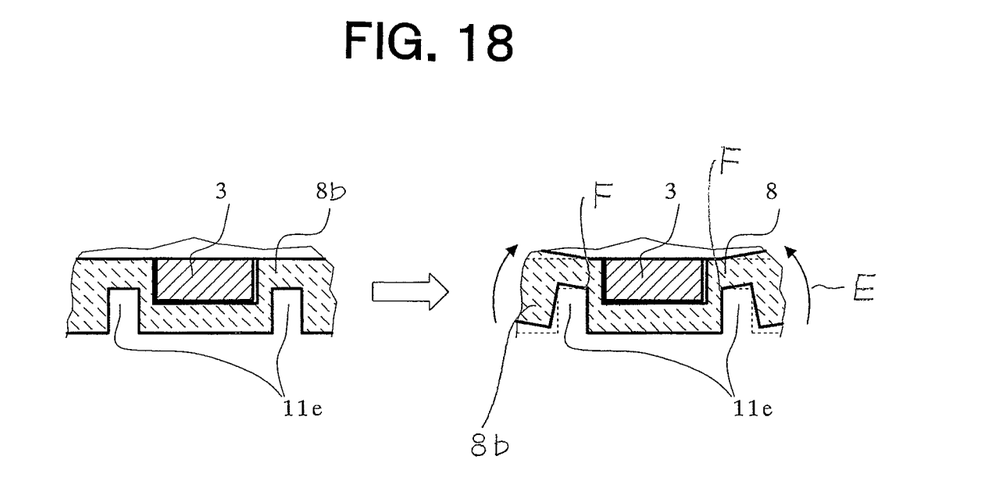
FIG. 18 is a cross-sectional view of a flow rate detection element of FIG. 16.

In the fifth embodiment, it is possible to obtain the same effect as that of the first embodiment. In addition, as illustrated in FIG. 18, even when shrinkage stress in an arrow E direction is generated in the plate 8b and deformation occurs along a short-side direction, the plate 8b is deformed from starting points F. Therefore, it is possible to further reliably reduce the stress applied to the flow rate detection element 3.

Sixth Embodiment

Figure 19:
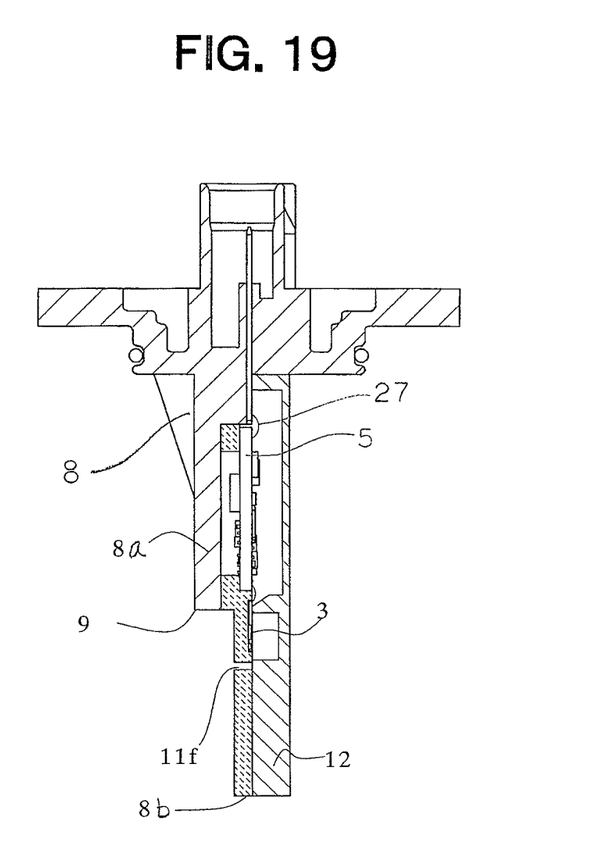
FIG. 19 is a cross-sectional side view of a flow rate measuring apparatus according to a sixth embodiment of the present invention.
Figure 20:
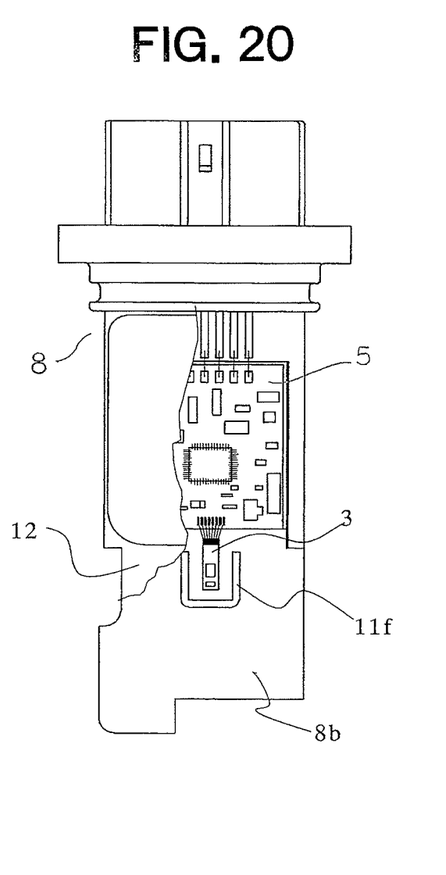
FIG. 20 is a partially cut-away front view of the flow rate measuring apparatus of FIG. 19.
Figure 21:
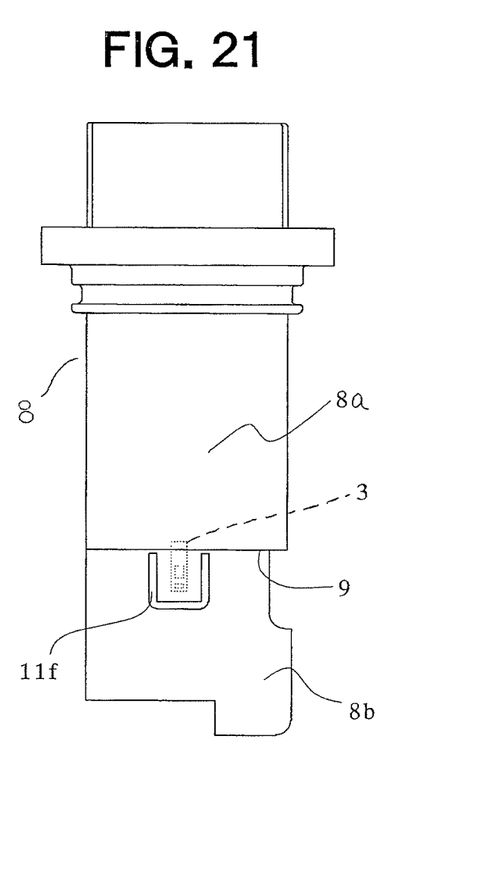
FIG. 21 is a back view of the flow rate measuring apparatus of FIG. 19.

FIG. 19 is a cross-sectional side view of a flow rate measuring apparatus according to a sixth embodiment of the present invention. FIG. 20 is a partially cut-away front view of the flow rate measuring apparatus of FIG. 19. FIG. 21 is a back view of the flow rate measuring apparatus of FIG. 19.

In this embodiment, the plate 8b is provided with a through-hole 11f serving as stress reducing means and surrounding the flow rate detection element 3 on three sides. The through-hole 11f is filled with the bonding material, and prevents the bypass passage 7 from communicating to the outside.

The other components are the same as those of the first embodiment.

In the sixth embodiment, in comparison with the case of the fifth embodiment, the stress reducing effect with respect to the flow rate detection element 3 is further increased.

Note that, similarly to the case of the first embodiment, one through-hole 11f extending in a lateral direction may be formed on the lower side of the flow rate detection element 3.

Note that, in each of the above-mentioned embodiments, for convenience in handling during manufacturing process, the support member 8 is constituted by two members, that is, the base 8a and the plate 8b, and the base 8a and the plate 8b are bonded to each other with the bonding material in the middle of the manufacturing process. However, the base and the plate may be formed integrally through molding.

Further, in each of the above-mentioned embodiments, the flow rate measuring apparatus including the cover 12 forming the bypass passage 7 together with the plate 8b is described. However, the present invention is applicable also to a flow rate measuring apparatus including no cover, for directly measuring the flow rate of air flowing in the intake pipe 1.

Further, the base 8a and the plate 8b are made of the PBT resin. However, as a matter of course, the present invention is not limited thereto. The base 8a and the plate 8b may be made of another resin which is low in thermal conductivity and excellent in thermal resistance and electrical insulation.

Further, in each of the above-mentioned embodiments, the flow rate measuring apparatus installed in the intake pipe 1 of the internal combustion engine is described. However, the flow rate measuring apparatus may be installed in an exhaust pipe of the internal combustion engine.

Further, the fluid to be measured may include a fluid other than the air.

Further, as a matter of course, a plurality of stress reducing means in the above-mentioned embodiments may be combined.

Further, in each of the above-mentioned embodiments, in the support member 8, the region facing the detection portion 10 is thinner than the region facing the circuit board 5. However, the present invention is applicable also to the case where the region facing the detection portion 10 is thicker than the region facing the circuit board 5.

What is claimed is:

1. A flow rate measuring apparatus installed in a piping and inserted into an insertion hole formed in the piping, for measuring a flow rate of a fluid to be measured passing through the piping, the flow rate measuring apparatus comprising:

a flow rate detection element for detecting the flow rate of the fluid to be measured;

a circuit board provided on a side of the insertion hole with respect to the flow rate detection element, for driving the flow rate detection element; and a support member made of a resin, for supporting the circuit board and the flow rate detection element, the support member comprising a stepped portion formed between a region facing the circuit board and a region facing a detection portion of the flow rate detection element, wherein the support member comprises stress reducing means provided on a side opposite to the insertion hole with respect to the region facing the detection portion, for reducing stress applied to the flow rate detection element.

2. A flow rate measuring apparatus according to claim 1, further comprising a resin cover superimposed onto the support member to form, together with the support member, a bypass passage through which part of the fluid to be measured flows in.

3. A flow rate measuring apparatus according to claim 2, wherein the support member and the resin cover are bonded to each other with a thermosetting bonding material.

4. A flow rate measuring apparatus according to claim 2, wherein the resin cover has a thickness in a direction perpendicular to a flow rate detection surface of the detection portion exposed to the fluid to be measured, the thickness being larger than a thickness of the support member in the region facing the detection portion.

5. A flow rate measuring apparatus according to claim 1, wherein the stress reducing means comprises a groove portion formed in a surface of the support member opposite to a surface of the support member on which the flow rate detection element is placed.

6. A flow rate measuring apparatus according to claim 5, wherein the groove portion is formed to surround the flow rate detection element.

7. A flow rate measuring apparatus according to claim 1, wherein the stress reducing means comprises a through-hole.

8. A flow rate measuring apparatus according to claim 1, wherein the stress reducing means comprises a reinforcing portion covering a surface of the support member opposite to a surface of the support member on which the flow rate detection element is placed.

9. A flow rate measuring apparatus according to claim 8, wherein the reinforcing portion is made of a resin and molded integrally with the support member.

10. A flow rate measuring apparatus according to claim 1, wherein the stress reducing means comprises a groove portion formed in a surface of the support member on which the flow rate detection element is placed, and formed in a vicinity of a leading end portion of the flow rate detection element opposite to the insertion hole.

11. A flow rate measuring apparatus according to claim 1, wherein the support member comprises a base and a plate which is superimposed and bonded onto the base and on which the circuit board and the flow rate detection element are placed.

* * * * *